United States Patent [19]

Fietzke

[11] Patent Number: 4,644,792
[45] Date of Patent: Feb. 24, 1987

[54] METHOD AND APPARATUS FOR DETERMINING THE MASS CENTER OF A BODY

[75] Inventor: Guenter Fietzke, Lynchburg, Va.

[73] Assignee: American Hofmann Corp., Lynchburg, Va.

[21] Appl. No.: 744,946

[22] Filed: Jun. 17, 1985

[51] Int. Cl.[4] .............................................. G01M 1/26
[52] U.S. Cl. ......................................... 73/461; 73/65
[58] Field of Search ...................... 73/65, 66, 460, 461, 73/472

[56] References Cited

U.S. PATENT DOCUMENTS

| 2,219,795 | 10/1940 | Van Degrift | 73/461 |
| 2,746,299 | 5/1956 | Federn et al. | 73/461 |
| 3,727,027 | 4/1973 | Kaiser et al. | 73/461 |

FOREIGN PATENT DOCUMENTS 1003284  9/1965  United Kingdom ..................... 73/65

Primary Examiner—Michael J. Tokar
Assistant Examiner—John E. Chapman, Jr.
Attorney, Agent, or Firm—Fleit, Jacobson, Cohn & Price

[57] ABSTRACT

A mass centering method and apparatus for ascertaining and marking the location of the axis of inertia of rough or premachined rotating article, allowing the marked axis to be used as a centerline in further processing in order to keep the remaining unbalance in the finished article as low as possible. The location of the axis of inertia is determined by an ordinary balancing method, and is then positioned relative to a center marking point, such as the centerline of a center drill, by only two revolving movements: one being a rotation of the article about its own axis of rotation, and the other being an eccentric rotation of the article about the axis of a supporting fixture. An appropriate combination of angle settings for both revolving movements allows the system to locate a theoretically unlimited number of marking points within a circular range of a predetermined diameter. The balancing, centering and marking procedures can be combined into a single mass centering apparatus, or each procedure can remain separate and be performed by independent units following the same mass centering procedures.

9 Claims, 5 Drawing Figures

METHOD AND APPARATUS FOR DETERMINING THE MASS CENTER OF A BODY

BACKGROUND OF THE INVENTION

1. Field of the Invention

The present invention relates generally to balancing machines, and more particularly to a machine for determining the mass center of a rotating body and for marking the axis of inertia of the body.

2. Description of the Related Art

If the net mass distributed within a rotating body is asymmetrical to the body's axis of rotation, vibrations will be imparted to the body's bearings due to the centrifugal forces generated by the asymmetrical mass. If an axis of rotation can be found for the body such that the axis passes through the center of the body's mass, the net distribution of mass will be symmetrical about that axis and vibration will not be imparted to the body's bearings. Such an axis that passes through the body's center of mass is known as the body's axis of inertia. Physical laws establish a relationship between the location of a body's axis of inertia and the centrifugal forces generated when the body is rotated about an axis other than its axis of inertia. A mass centering machine determines and marks the axis of inertia in a body by measuring the unbalance in a body, calculating the distance between the body's axis of inertia and the centerline about which it was rotated as unbalance measurements were taken, and aligning the body's axis of inertia with the centerline of a marking device which makes a mark on the body indicative of a point through which the axis of inertia passes.

In order to align an article's axis of inertia with the centerline of a marking device, prior art mass centering machines shift either the article, the marking device, or both, in a combination of a minimum of two movements, as least one of which is linear. This linear movement may shift either the article or the marking device, the maximum amount of shifting required usually being very small. In order to obtain acceptable accuracy, this small shift must be divided into as many steps as possible, requiring expensive adjusting devices. As the stroke of the slide providing linear movement is very short, wear is confined to a small area of the slide. In some cases, especially in cases of two plane balancing, the devices providing X and Y adjustments are rotated with the article, resulting in structurally complicated and expensive mechanisms.

SUMMARY OF THE INVENTION

Briefly stated, in accordance with one aspect of the present invention, a mass centering apparatus is provided for measuring the unbalance of a body, calculating from such measurement and known physical laws the divergence between the body's centerline of rotation during measurement and the body's axis of inertia, and aligning the body's axis of inertia with a marking device which marks on the body at its axis of inertia. The mass centering apparatus includes the necessary elements of a common balancing machine in order to measure the body's unbalance, and also includes a processor to produce control signals which are derived from parameters of the body, the physical laws which relate unbalance in a body rotating about an axis with the location of the body's axis of inertia, and measurements of unbalance in the body. The control signals produced by the processor control motors to move two mechanisms in circular movements, one mechanism being the fixture-spindle unit used to support and drive the body as its unbalance was measured, the other mechanism being a rotatable housing which holds and supports the spindle. The combination of circular movements of the spindle and its housing together with a fixed eccentricity between the spindle and its housing moves the body so that its axis of inertia is aligned with a marking device. The marking device, also part of the mass centering machine, is used to place a mark on the body.

An object of the herein disclosed invention is to increase the accuracy and to decrease the technical complications of mass centering machines, and those mass centering procedures, operated with separate components.

This is accomplished by eliminating all linear adjustments and utilizing two circular adjustments instead. One of the circular adjustments will have the advantage of employing the rotating motion of the balancing mechanism, the second adjustment being obtained by using a turntable component suspending the balancing spindle and/or the fixture, which provides an eccentric rotation. This can be operated by a second drive, controlled by an angle control system, or it can be managed manually.

To increase the accuracy, it appears advisable to increase that movement, which controls the shift, over as large an expanse as possible to obtain the most measurement graduations. This is achieved with this invention by using rotating motions only. The adjustment span, serving the entire range of possible center marks, is spread through an angle of 180° and therefore can be controlled with high accuracy.

DETAILED DESCRIPTION OF THE PREFERRED EMBODIMENT

Figure 1:
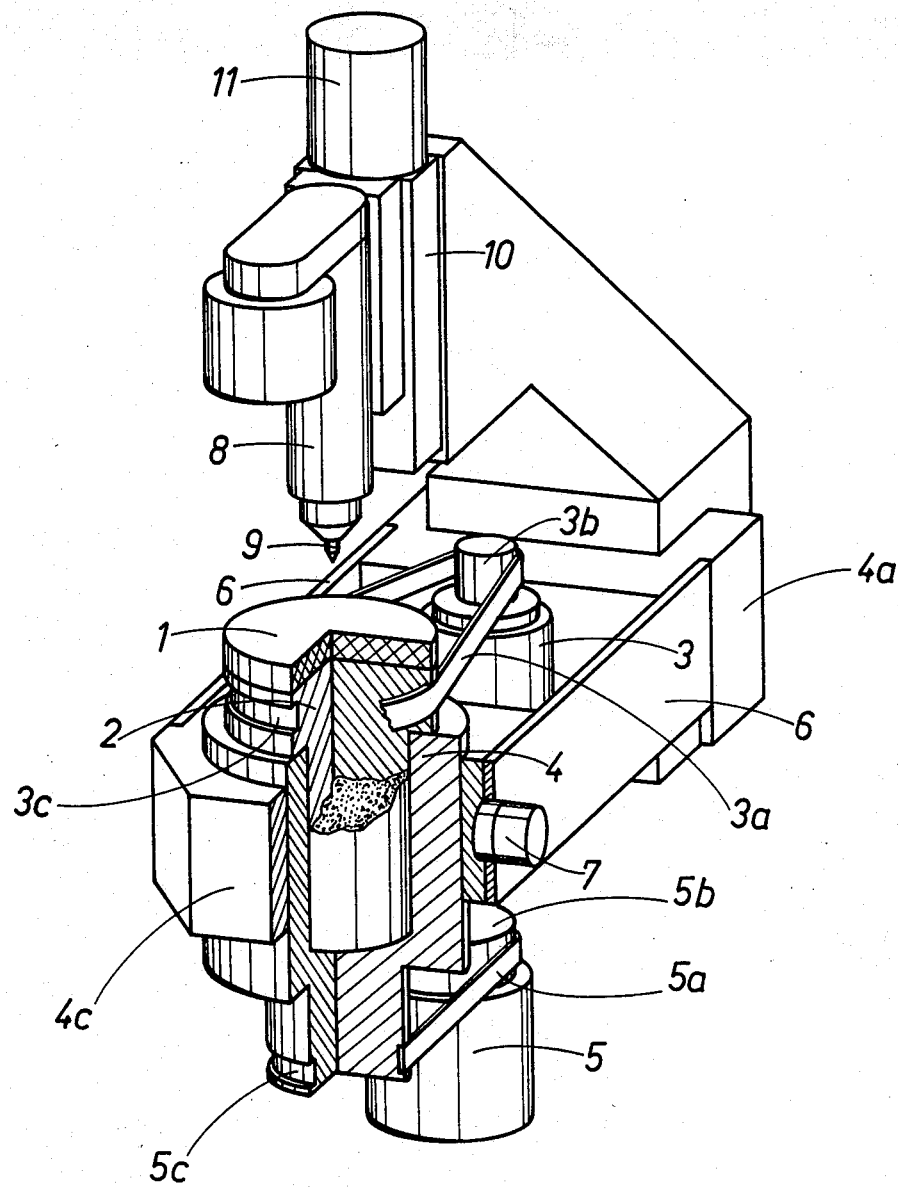
FIG. 1 is a perspective view, partially in section, showing a mass centering machine in accordance with the present invention.
Figure 2A:
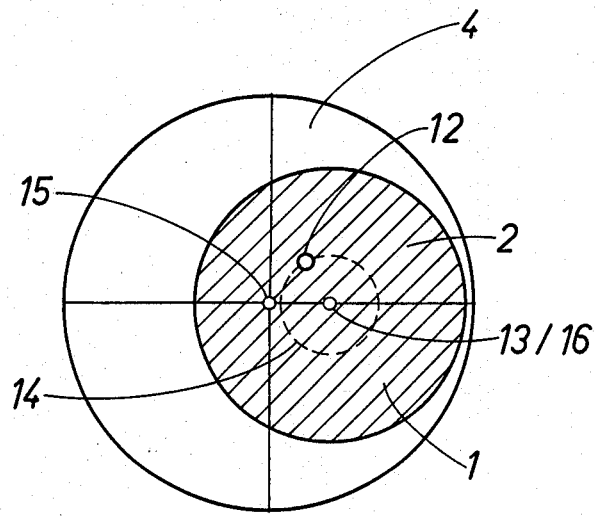
FIGS. 2a, 2b and 2c show the relative positions of spindle, housing, marking device, centerline, and axis of inertia for the mass centering machine of FIG. 1.
Figure 2B:
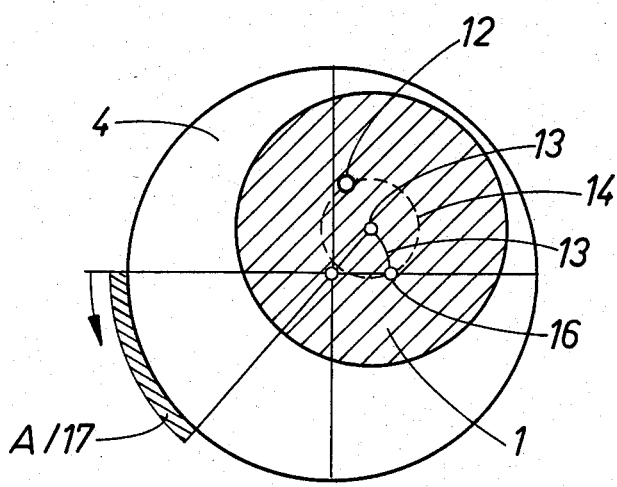
Figure 2C:
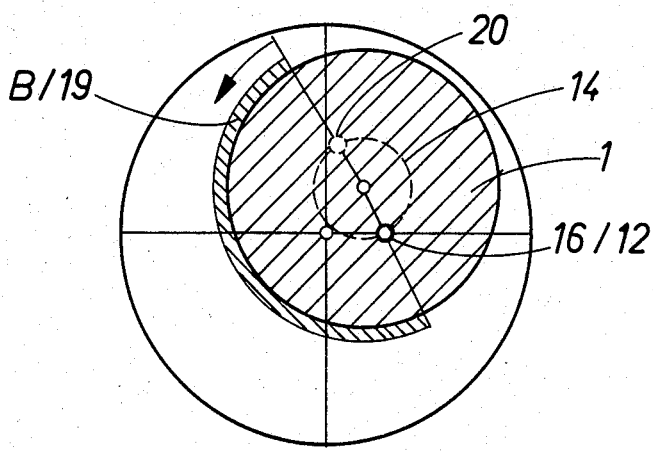
Figure 3:
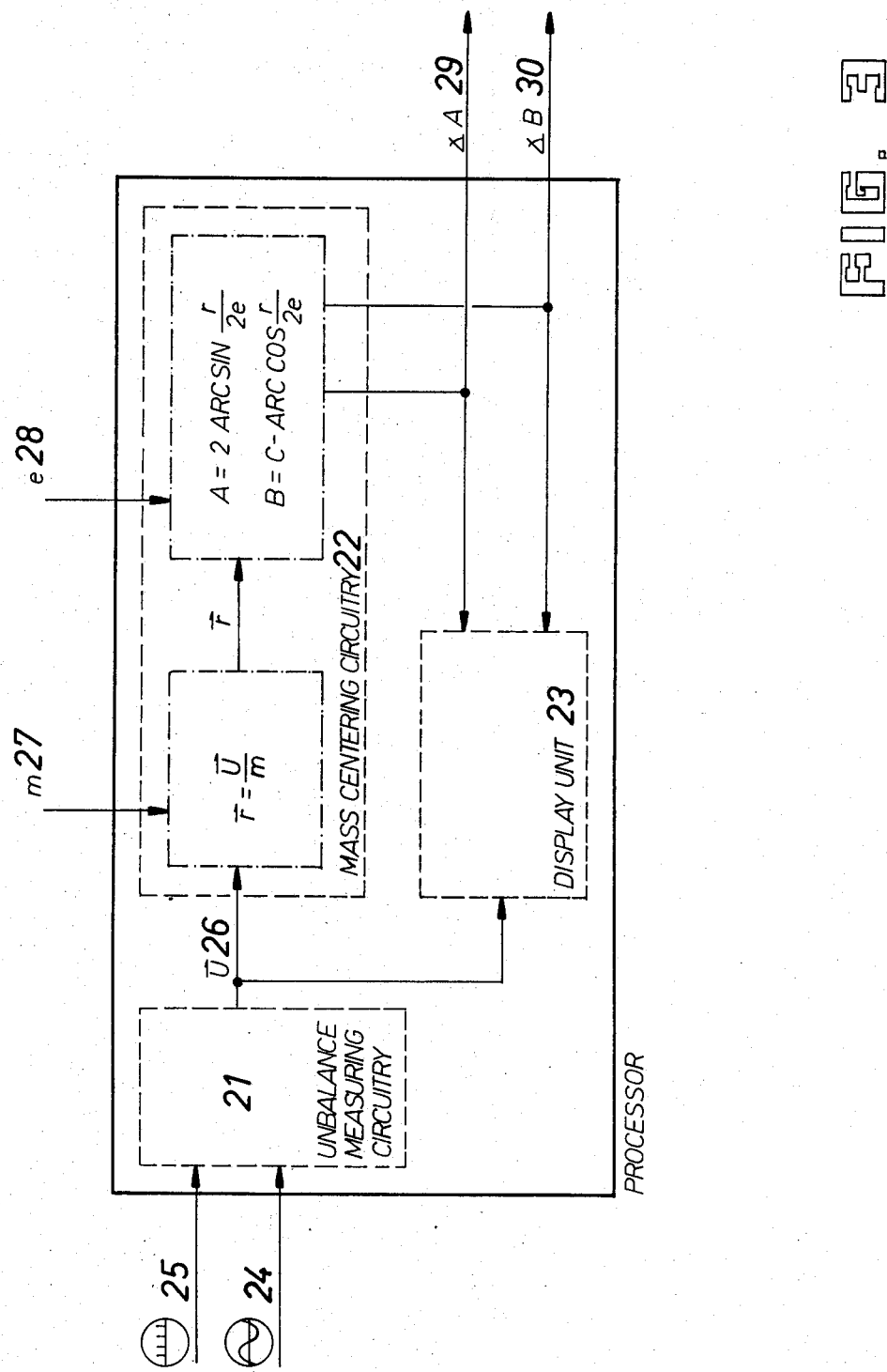
FIG. 3 is a block diagram of the processor used to produce control signals and to display information.

With reference to FIGS. 1, 2 and 3, an embodiment of a mass centering machine embodying the teachings of the present invention will now be described. FIG. 1 provides a generalized view of the mechanical components constituting the preferred embodiment of the mass centering machine. FIGS. 2a, 2b and 2c show the relationships between certain moving mechanical elements of the mass centering machine in carrying out the method of the present invention. FIG. 3 provides a block diagram of the data flow in the processor of the herein described mass centering machine, consisting of measuring data, fixed parameters, display and control signals.

In FIG. 1 are shown the mechanical components comprising the mass centering machine. These can be grouped by function into those which are used for the measurement of unbalance in a body, those which are used to move the body such that its axis of inertia is aligned with a marking device, and those which are used to mark the body. Where feasible, components which can serve in more than one group are so used.

The components in FIG. 1 which are used to measure unbalance in a body 1 are a fixture-spindle unit 2, hereinafter collectively referred to as "a spindle" because the fixture and spindle move together in this embodiment. Also included are a housing 4 rotatably carried in a housing retainer 4c, an angle setting and drive motor 3, flat springs 6 carried on a frame 4a, and a force sensing transducer 7 carried by the housing retainer 4c. The body 1 which is to be measured for unbalance is suitably secured to the spindle 2 by providing a collet, chuck, or other article retaining fixture thereon, the structure and operation of which are well known to those skilled in the art, and the spindle is rotated by the angle setting and drive motor 3 by means of a belt 3a that passes around a drive pulley 3b connected to the drive shaft of motor 3 and a groove 3c that defines a belt-receiving surface on spindle 2. The angle setting and drive motor 3 is attached to the mass centering machine's frame 4a, and through appropriate controls it rotates the spindle continuously at a desired speed as measurements of unbalance are taken, or, alternatively, it rotates the spindle through a specific angle with reference to an arbitrary known position on the housing hereafter called an index mark. The housing 4 is a cylindrical structure that includes a concentric cylindrical opening to support cylindrical spindle 2 while allowing the spindle to rotate within it. The housing 4 is carried in housing retainer 4c on one end of flat springs 6 which are attached to the frame 4a of the mass centering machine and allow the housing retainer to transmit to the force sensing transducer 7 the centrifugal forces that are generated in the body as a result of unbalance when it rotates. The force sensing transducer produces electrical signals proportional to the centrifugal forces impressed upon it.

The components in FIG. 1 which are used to align the axis of inertia of the body 1 with the centerline of a pointed marking device 9 are the spindle 2, the angle setting and drive motor 3, the housing 4 and a second angle setting motor 5. The housing 4, rotatably carrying the spindle 2 with it, is itself rotatably carried in housing retainer 4c, and can be rotated with respect to the flat springs 6 and force transducer 7 by the angle setting motor 5 by means of an endless drive belt 5a that passes around a pulley 5b secured to the drive shaft of motor 5 and an annular belt-receiving groove 5c formed on the periphery of housing 4. The spindle 2 can be rotated independently of the housing 4 by the angle setting and drive motor 3. The centerline of housing 4 is eccentric with respect to the centerline of spindle 2. The combination of eccentricity between the centerlines and the rotary motions of the spindle and housing permit movement of the spindle with the body 1 affixed to a position which aligns the body's axis of inertia with the centerline of the marking device 9. Control signals to produce the required angular rotation of the angle setting and drive motor 3 and of the angle setting motor 5 are provided by a processor using the measurement of the amount of unbalance in the body, parameters of the body, the spindle, and the housing, and physical laws relating unbalance in a body to the body's axis of inertia.

The components which are used to mark the body's axis of inertia are, in the preferred embodiment, a marking device 9 in the form of a pointed center drill, drill unit 8, a slide 10, and slide feed motor 11. The linear movement of the drill unit along the slide 10 moves the center drill 9 along the axis of the center drill 9 only.

FIGS. 2a, 2b and 2c illustrate the geometric relationships between the spindle 2, the body 1, the housing 4, the axis of inertia 12, and the centerline of the marking device 16. Physical laws governing the relationships are presented where appropriate.

In FIG. 2a, the shaded area represents the spindle 2 with the body 1 affixed to it. As shown, the spindle centerline 13 is eccentric to the housing centerline 15. The housing is represented by the larger unshaded circle. During measurement of unbalance the spindle rotates about its centerline 13, which is exactly aligned to the marking device's centerline 16. The measurement of unbalance will determine the body's axis of inertia 12 which, while the spindle is rotating, describes a circle 14 about the spindle centerline 13. The measurement of unbalance determines the radius of the circle 14 described by the axis of inertia, and the angular location of the axis of rotation with respect to a reference index on the spindle according to the following relationship:

$$\vec{r} = \frac{\vec{U}}{m} \quad (1)$$

where r is a vector whose magnitude is the linear displacement between a body's axis of inertia and the body's center of rotation, and whose direction is in reference to an index mark on the spindle, $\vec{U}$ is the vector of unbalance, and m is the mass of the body.

FIG. 2b shows the positions of the elements illustrated in FIG. 3a after counterclockwise rotary motion is imparted to the housing 4 by second angle setting motor 5 in the process of aligning the axis of inertia 12 of the body 1 with the centerline 16 of the marking device. With the spindle 2 stationary relative to housing 4, the housing, while carrying the spindle with it, is rotated about its own axis until the centerline of the marking device 16 lies on the circular path 14 described by the body's axis of inertia.

The rotation angle A by which the outer periphery of housing 4 is rotated to sweep arc 17 is defined as follows:

$$A = 2 \arcsin \frac{r}{2e} \quad (2)$$

where

A is the angle through which the housing must be rotated with respect to the position of the housing at the time when unbalance measurements are taken, in order that the centerline 16 of the marking device intersects the circular path described by the axis of inertia of the body, r is a scalar value representing the radius of the circular path described by the axis of inertia of the body relative to its axis of rotation, and e is the eccentricity or offset distance between the centerline 13 of the spindle and the centerline 15 of the housing.

As the housing 4 is rotated through angle A, the centerline 13 of the spindle, which is stationary relative to the housing, moves along a circular path defined by arc 18. Thus, centerline 13 is no longer aligned with the centerline 16 of the marking device.

FIG. 2c shows the positions of the elements illustrated in FIG. 2b after counterclockwise rotation of the spindle 2 relative to the housing 4 to align the axis of inertia of the body with the centerline 16 of the marking device. The spindle is rotated about its centerline until its periphery sweeps an arc 19 and the axis of inertia 12 moves from position 20 (the result of rotary motion of the housing shown in FIG. 2b) and is aligned with the centerline 16 of the marking device. The angle B through which the spindle must be rotated is:

$$B = C - \arccos \frac{r}{2e} \quad (3)$$

where

B is the angle through which the spindle must be rotated with respect to the reference index on the spindle.

C is the angular direction of vector r, the polar position of the body's axis of inertia with respect to the spindle's centerline and reference index, r is the scalar magnitude of vector r, and e is the eccentricity of offset distance between centerline 13 of the spindle and centerline 15 of the housing.

FIG. 3 shows a block diagram of the processor used in the mass centering machine. The processor contains unbalance measuring circuitry 21, mass centering circuitry 22, and a display unit 23. The unbalance measuring circuitry performs functions that are common to balancing equipment as known by those skilled in the art. Signals entering the unbalance measuring circuitry represent the centrifugal force 24 produced by an unbalanced body during its rotation and the rotational speed 25 of the body. A signal leaving the unbalance measuring circuitry 21 represents the unbalance vector $\vec{U}$ 26. Signal 26 is routed by interconnecting circuitry to display unit 23 and to the mass centering circuitry 22. The mass centering circuitry 22 contains preset values relating to the body's mass, M 27, and relating to the eccentricity, e 28, which is defined in formulae 2 and 3. From signals 26 and 27, the mass centering circuitry 22, calculates vector $\vec{r}$ which is defined in formula 1. Vectors $\vec{r}$ and $\vec{U}$ 26 are transposed by the mass centering circuitry 22 into their polar forms to find the scalar value of r and the angle C which is defined in formula 3. The scalar value r and the eccentricity e 28 are used by the mass centering circuitry to calculate angle A which is defined in formula 2 and are used again together with angle C to calculate angle B as defined in formula 3. A signal representing angle A 29, is routed by interconnecting circuitry to the controls of angle setting motor 5 where it regulates the turning of motor 5. Another signal representing angle B 30, is routed to the controls of angle setting and drive motor 3 where it regulates the turning of motor 3. The signals 29 and 30 are also routed to the display unit 23.

The sequence of operations followed by the mass centering machine in its preferred embodiment will now be described. The body 1 whose axis of inertia is to be marked is secured to the spindle 2. The operator initiates an automatic cycle comprised of unbalance measurements, alignment of the axis of inertia of the body to the centerline of the marking device, and the marking operation. Once initiated, suitable controls cause the following sequence of operations: the angle setting and drive motor 3 is energized to rotate the spindle 2, and as the spindle rotates, unbalance of the body 1 relative to the spindle axis produces centrifugal forces that are detected by the force detecting transducer 7. When the spindle reaches a steady rpm, the electrical signals from the force detecting transducer 7 are processed by a suitable electronic processor (FIG. 3), to determine the unbalance of the body, and a control signal is generated which stops the angle setting and drive motor 3. The processor calculates from the unbalance and the parameters of the body's weight 27, and of the eccentricity 28 between the centerlines of the spindle 2 and of the housing 4, the required angular movement 17 of the housing relative to the spindle, and the required angular movement 19 of the spindle relative to the housing to align the axis of inertia of the body with the centerline of the marking device 9. Based on the calculations, the processor produces control signals that cause the angle setting and drive motor 3 to rotate the spindle through an angle A, according to formula 2, and that then cause the second angle setting motor 5 to rotate the housing through an angle B, according to formula 3. With the spindle and housing rotated through their respective calculated angular positions, the processor then provides a control signal to energize the feed motor 11 of the marking device to move the drill unit 8 linearly along slide 10. By means of suitable position sensing switches, such as limit switches, the linear movement of the drill unit 8 can be controlled. When the drill unit 8 has moved downwardly a sufficient distance for the center drill 9 to contact and mark the body 1, a position sensing switch is actuated to energize the drill unit 8. The drill unit then rotates the center drill when it is in contact with the body to thereby mark it and thereafter the drill unit is returned to its initial upper position spaced from the body. The body is then removed from the spindle by the operator.

Although particular embodiments of the present invention have been illustrated and described, it will be apparent to those skilled in the art that various changes and modifications can be made without departing from the spirit and scope of the present invention, and it is intended to cover in the appended claims all such changes and modifications that fall within the scope of the present invention.

What is claimed is:

1. Apparatus for determining the location of the axis of inertia of a body and for marking a point on the surface of the body through which the axis of inertia of the body passes, said apparatus comprising:
   (a) holding means for holding a body for which the location of the axis of inertia is to be determined;
   (b) first rotation means for rotating the holding means about a holding means axis;
   (c) measuring means for measuring the unbalance of the rotating body and for calculating the location of the axis of inertia of the body, said measuring means including a housing for rotatably receiving the holding means and force-sensing transducer means positioned adjacent the housing for sensing centrifugal forces induced by unbalance in the rotating body;
   (d) marking means for making a mark on the surface of the body at the location of the axis of inertia, said marking means including a marking point; and
   (e) positioning means for positioning the body to align the axis of inertia thereof with the point of the marking means to cause the surface of the body to be marked to identify a point on the surface through which the axis of inertia passes, said positioning means including second rotation means to rotate said housing about a second axis of rotation spaced from the holding means axis.

2. Apparatus in accordance with claim 1 wherein the marking means includes a pointed marking device in the form of a rotatable drill, and means for moving said marking device toward and away from the body.

3. Apparatus in accordance with claim 1 wherein said positioning means includes a housing retainer for rotatably receiving said housing.

4. Apparatus in accordance with claim 1 wherein said first and said second rotation means are operable independently of each other.

5. Apparatus in accordance with claim 4 wherein said holding means axis and said second axis of rotation are substantially parallel.

6. Apparatus in accordance with claim 5 wherein said axes extend substantially vertically.

7. A method for determining the location of the axis of inertia of a body and for marking a point on the surface through which the axis of inertia passes, said method comprising:
 (a) determining the axis of inertia of a body by rotating the body about a first axis of rotation;
 (b) calculating the linear distance between said first axis of rotation and the axis of inertia of the body;
 (c) rotating said body about a second axis of rotation and through a first angle to cause said first axis of rotation to intersect and pass through a point on the periphery of an imaginary circle having a center defined by said first axis of rotation and a radius defined by said linear distance;
 (d) rotating said body about said first axis of rotation and through a second angle to align the axis of inertia of the body with the first axis of rotation; and
 (e) marking the surface of the body with a marking device at the point through which the axis of inertia passes.

8. A method for determining the location of the axis of the inertia of a body and for marking a point on the surface thereof through which the axis of inertia passes, said method comprising:
 (a) mounting the body on a holder having a holder axis of rotation;
 (b) mounting the holder in a housing having a housing axis of rotation;
 (c) rotating the holder at a predetermined speed about the holder axis;
 (d) measuring the degree of unbalance in the body relative to the axis of rotation of the holder;
 (e) calculating the location of the axis of inertia of the body;
 (f) providing a marking device spaced from said body and movable linearly toward and away from the body along a predetermined line;
 (g) rotating the housing through a first angle sufficient to align the predetermined line of the marking device at a point on an imaginary circle having as its center the axis of rotation of the holder and having a radius defined by the linear distance from the axis of inertia of the body to the axis of rotation of the holder;
 (h) rotating the holder through a second angle sufficient to align the axis of inertia of the body with the predetermined line of the marking device;
 (i) moving the marking device into contact with the body; and
 (j) marking the body with the marking device to identify a point on the surface of the body through which the axis of inertia passes.

9. A method in accordance with claim 8 including the step of stopping the rotation of the holder about the holder axis before rotating the housing.

* * * * *